April 26, 1966  F. H. DILL, JR., ETAL  3,247,576
METHOD OF FABRICATION OF CRYSTALLINE SHAPES
Filed Oct. 30, 1962  2 Sheets-Sheet 1

INVENTORS
FREDERICK H. DILL, JR.
RICHARD F. RUTZ

BY *Ahin J. Riddles*

ATTORNEY

April 26, 1966  F. H. DILL, JR., ET AL  3,247,576
METHOD OF FABRICATION OF CRYSTALLINE SHAPES
Filed Oct. 30, 1962  2 Sheets-Sheet 2

United States Patent Office 3,247,576
Patented Apr. 26, 1966

3,247,576
METHOD OF FABRICATION OF CRYSTALLINE SHAPES
Frederick H. Dill, Jr., Putnam Valley, and Richard F. Rutz, Cold Spring, N.Y., assignors to International Business Machines Corporation, New York, N.Y., a corporation of New York
Filed Oct. 30, 1962, Ser. No. 234,141
10 Claims. (Cl. 29—155.5)

This invention relates to crystallography; and, in particular, to the fabrication of very precise, extremely small, crystalline shapes.

The manifestation of the phenomenon of stimulated emission of radiation in solid state devices has resulted in very stringent requirements being placed on the shape and dimensions of these devices. Where electromagnetic energy in the light wavelength region is involved, the requirements on the crystalline body of which the device is made are such that the surfaces frequently must be plane parallel, optically reflective and be operationally related to each other by physical dimensions which are of the order of magnitude of a few multiples of the light wavelength.

With such stringent requirements being placed on a device roughly comparable to the size of a human hair the problem of fabrication has become nearly insurmountable. In order to fabricate an object having such a size the object must be shaped from some larger quantity of the material from which the object is made and this requires extreme care not only to prevent errors in the actual shaping operation but also in the protecting of the object from damage during the shaping. These manufacturing problems have in combination resulted in making the advancement of the art much more difficult.

What has been discovered is a technique for the fabrication of crystalline bodies into physical shapes wherein the control of dimensions is of the order of magnitude of light wavelength while simultaneously providing extremely accurate optically flat surfaces related by accurate geometrical intersections. This is accomplished in accordance with the invention by establishing the force product of the bond strength times the distance through the crystal coinciding with the crystallographic plane having the minimum bond strength to be less than the force product of any other distance times the crystallographic plane bond strength coinciding with that distance and subjecting the crystal to a force whereby separation in the proper direction occurs. The separation is thus accomplished with a minimum of force being applied.

It is an object of this invention to provide an improved fabrication technique for crystalline bodies.

It is another object of this invention to provide a technique of providing optically flat surfaces.

It is another object of this invention to provide crystalline bodies having crystallographically perfect parallel and perpendicular shapes.

It is another object of this invention to provide crystalline bodies having crystallographically perfect geometric shapes.

It is another object of this invention to provide crystalline bodies having surface dimensions separated by very short distances approaching the magnitude of light wavelength.

It is an object of this invention to provide an improved method of fabricating small crystalline devices.

The foregoing and other objects, features and advantages of the invention will be apparent from the following more particular description of a preferred embodiment of the invention, as illustrated in the accompanying drawings.

Figure 1:
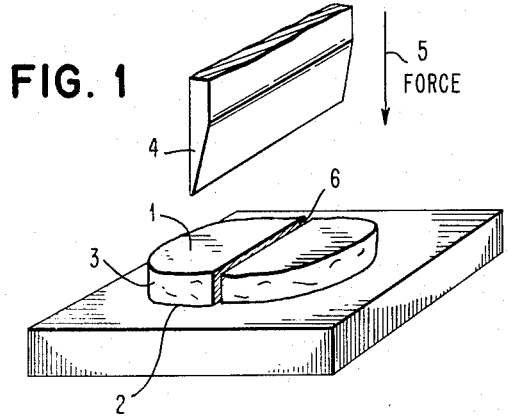
FIG. 1 is a view illustrating a step of the shaping operation in accordance with the invention.

As the frequency of electromagnetic energy handled in solid state devices has increased and proceeded into the light wavelength region the requirements on the physical shapes of the crystalline bodies have become more and more difficult to achieve. Where devices such as lasers are constructed, these requirements can be on the order of a few multiples of the light wavelength. For example, to establish a proper perspective, light at the limit of optical visibility has a wavelength of the order of 8000 angstrom units which in turn is of the order of 0.000032 inch or 32 millionths of an inch.

Further, advances in the art involving optical mode enhancement in these devices have placed stringent requirements not only on the physical dimensions between surfaces but also on the angle that those surfaces make with each other and the optical reflectivity of the surfaces. The surfaces not only must be optically flat for reflection purposes and to reduce light scattering but they must also meet at the proper angle, and further, the distance from one reflecting surface to another must be within a selected range of multiples of the wavelength involved. Frequently this requires that a surface be flat within a twentieth of a wavelength and that the surfaces intersect at a precise angle such as 90°.

Thus far in the art such requirements and the extreme smallness of the objects being handled have required extreme care in fabrication. The object must be oriented generally with X-ray equipment and then properly supported, generally by embedding in a plastic material for grinding to a precise dimension. This is repeated for each side. When each dimension and its relationship to others is established, the object then must be removed from the supporting material and examined for such misfortunes as over-stressing, cracking, formation of dislocations, and otherwise changing of properties due to the abrasion or other shaping operation employed. Associated with each step are handling and mounting problems which in combination cause great difficulty in getting a good device.

In accordance with the invention, in a preferred embodiment crystalline shapes having very high precision optically flat faces related in exact geometries and spacing can be achieved by supporting the crystal on a broad area crystallographic face that is perpendicular to the crystallographic plane having the minimum bond strength of the particular crystalline material and then applying a cleaving force perpendicular to the crystallographic plane having minimum bond strength in the direction of the support. This will operate to cleave the crystal on a precise line which corresponds to the minimum bond strength crystallographic plane and will result in making available the internal structure of the crystalline body to govern the optical flatness of the surfaces and the angles that the surfaces make with each other. As a result of the teaching of the invention, bodies may be fabricated with surface flatness considered to approach 10 angstrom units and devices may be fabricated to size on the order of 0.0015×0.0015×0.005 inch.

Referring now to FIG. 1 in accordance with the invention the crystalline body undergoing fabrication is oriented and cut into a wafer having major surfaces coinciding with a crystallographic face that is perpendicular to the plane of the minimum bond strength of the crystal.

For crystals of the polar type, such as the intermetallic compounds well known in the semiconductor art including, for example such compounds as gallium arsenide (GaAs), indium phosphide (InP), and indium antimonide (InSb), the plane of minimum bond strength is the [110] crystallographic plane.

In cubic type crystals, such as the mono-atomic semiconductors, germanium and silicon, the crystallographic plane of minimum bond strength has been found to be the [111] plane.

The identification of the crystallographic planes is accomplished in the art by bracketed numerals known as Miller Indices. These indices are established by taking the reciprocal of the intercept values where the crystallographic plane intersects the three imaginary dimension axes of the periodic atomic array of the crystal. For example, for the [110] crystallographic plane this plane intercepts two of the three axes one unit from the point of axis intersection and is parallel to the third of these three axes so that the reciprocals would then be 1/1, 1/1, and 1/∞ so as to give the Miller Indices 1, 1, and 0.

The art of crystallography is set forth in many references, for example An Introduction to Semiconductors by W. C. Dunlop, Library of Congress Card No. 56–8691, Chapter 2, and the references cited therein. Another example is Elementary Crystallography by Martin J. Buerger, published in 1956 by John Wiley and Sons.

Returning to FIG. 1, a crystal wafer 1 is shown having faces 2 and 3 that are cut perpendicular to the minimum bond crystallographic plane for the particular type of crystal. This minimum bond crystallographic plane is the plane preferred by the crystal for cleavage. The cutting of the wafer 1 is accomplished by mounting the crystal for appropriate X-ray orientation wherein information related to the refraction of X-rays from particular crystallographic planes is calibrated in terms of crystal position and then slicing the crystal perpendicular to the minimum bond strength crystallographic plane in accordance with this information. The X-ray orientation technique is well known in the art and since equipment is available for its practice, it will not be described in detail. Any orientation technique including trial crystal breaking to determine preferred cleavage planes that will permit positioning of a crystal for cutting with reference to a particular crystallographic plane therein may be employed. After the cutting operation many device fabrication steps such as lapping, polishing, diffusion, epitaxial growth, junction formation, mirroring of surfaces, and application of contacts may be accomplished at this point.

The crystal is then positioned with the cut surface bearing on a supporting member which serves to distribute stresses uniformly so that a cleavage force can be exerted in the direction to overcome the minimum bond strength in the crystal. It is essential that the crystal be supported over a sufficiently broad area that localized stresses do not have resultants in undesirable directions when the cleavage force is applied, however, the support may have some resilience. The support is shown schematically as a block for perspective purposes.

A force member 4 shown schematically as a blade is next brought in contact with the crystal 1. Movement is in the direction of arrow 5 and because of the shape of the blade 4, force is applied in the direction to separate the parts of the crystal and overcome the minimum bond strength. The force may be applied on the entire surface or on a restricted point so that the cleavage may propagate through the crystal. The blade 4 is shown after having been removed and the crystal 1 has been cleaved along the plane of minimum bond strength leaving an opening 6 where the crystalline parts separated. The force member and support are shown schematically as a blade 4, and a block not having a reference numeral; however, separation may be effected by any source of localized stress such as an ultrasonic vibration which employs the localized stresses in the crystal body. In the case of the ultrasonic force application, the crystal may be in a liquid bath.

In accordance with the invention, it is essential only that the crystal be subjected to a localized stress in a direction that gives the minimum force to separate the crystal along the plane of minimum bond strength through the particular crystalline body being processed. For example the crystal is supported along a crystallographic plane that is perpendicular to the face to be exposed by cleavage and that this face corresponds to the crystallographic plane of minimum bond strength in the crystal. The orientation and larger crystalline material body shape being processed must cooperate to insure not only the correct ultimate device shape but also to insure that no undesired stresses or fractures be introduced by random forces. The crystal is subjected to stress, and this stress so applied that the parts will separate with the absolute minimum of force and the cleavage preferably is the minimum distance through the crystal. When this occurs, the face exposed is optically flat and the angles made with each exposed face is the perfect geometrical angle the cleavage planes make in the crystal. The crystallographic geometry of the crystal is now available for further cleavage operations and thus will govern the precise relationship of interplane parallelism and the angle of intersection and all faces exposed will be optically flat. In the majority of devices wherein volumetric geometry of surfaces is required there are at least two cleavage operations involved.

Figure 2:
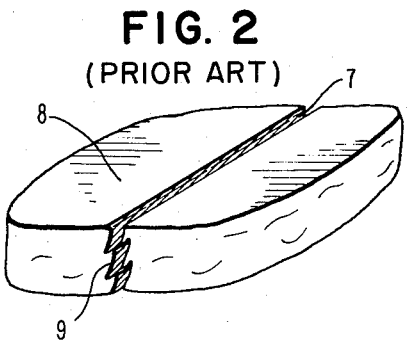
FIG. 2 is an illustration of typical prior art crystalline cleavage.

The cleavage of brittle objects is a very ancient art having been practiced in the diamond cutting and stone cutting trade. However, in the past cleavage operations were directed to merely dividing objects into parts and this is widely used in transistor fabrication to separate several devices made simultaneously. This frequently resulted in irregular surfaces as illustrated in FIG. 2, however, the broken edges in the past have played no part in the operation of the device. In FIG. 2 the cleavage cut 7 in the crystal 8 if arbitrarily made will result in a jagged edge surface 9 made up of facets from various crystallographic planes. Fractures of this type are frequently referred to in the art as "conchoidal." The crystallographic plane relationship within an electro-optical device employing its volumetric geometry has not been employed in the cleavage art to date.

In contrast, in accordance with the invention the stress is so applied that the cleavage force is applied in a direction such that the entire crystal severs when the absolute minimum stress is applied.

Figure 3:
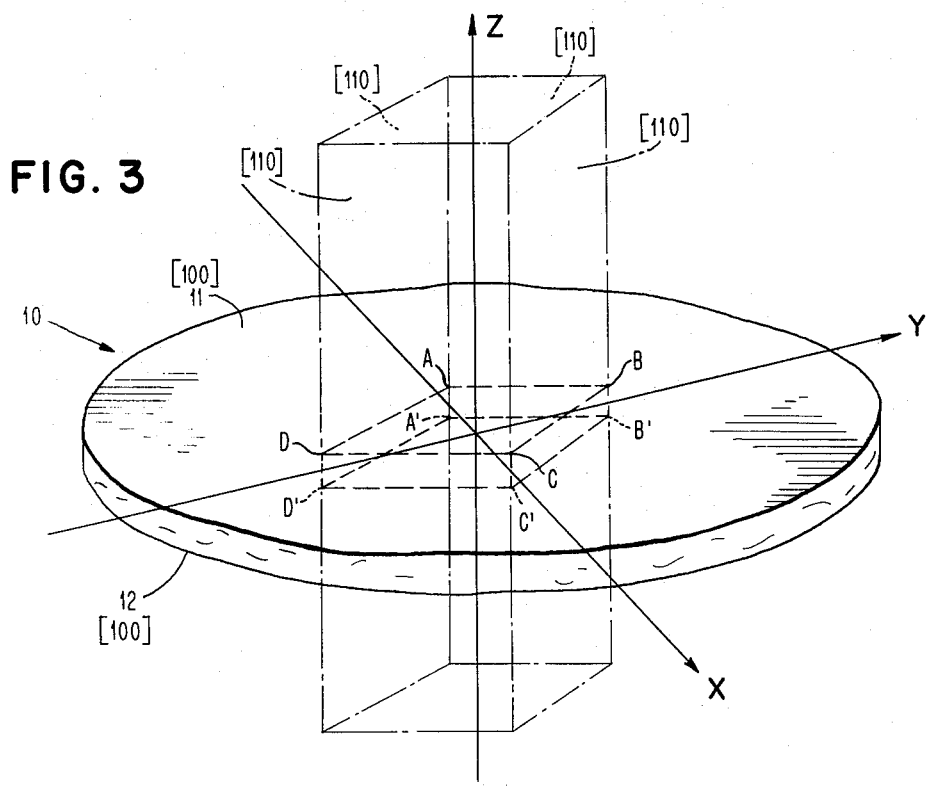
FIG. 3 is a view of a geometrical relationship between the [100] plane and the [110] plane in a crystal.

As previously stated in polar type crystals of the type such as the intermetallic semiconductors well known in the art, for example gallium arsenide, the cleavage plane of minimum bond strength is the [110] crystallographic plane. In FIG. 3, there is illustrated the geometrical relationships present in the crystal with relation to the [110] and [100] crystallographic planes. To provide perspective, a wafer 10 is illustrated having $x$ and $y$ axes lying in its upper surface 11 and a $z$ axis being perpendicular thereto. The [100] planes each intersect perpendicularly four planes correlatable with [110] planes each so labelled in FIG. 3. The surface 11 corresponds to the [100] crystallographic plane. The planes in the surfaces of the wafer 10 each intercept the $z$ axis at 1 or −1 unit and are parallel to both the $x$ and the $y$ axes, hence the Miller Indices [100]. These planes, as may be seen from FIG. 3, have been identified with the rectangle ABCD in surface 11 and A'B'C'D' in the lower surface 12 of the crystal wafer. As is illustrated, the geometric relationship within the crystal will permit identification of four rectangular planes of intersection of the [110] or equivalent crystallographic plane and the [100] crystallographic plane. In accordance with the invention when the surface of the crystal has been made to correspond with the [100] plane so that the two rectangles ABCD and A'B'C'D' representing the surfaces 11 and 12 of the wafer now intersect perpendicularly four [110] crystallographic planes each in turn joining an adjacent plane at 90°. These intersections are illustrated by four rectangles which are identified as AA'D'D, ABB'A', BCC'B', and CC'D'D.

Figure 4:
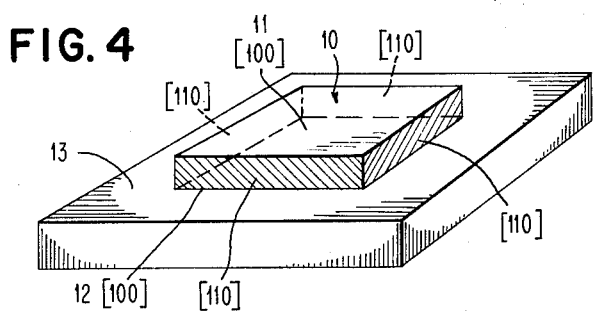
FIG. 4 is a view of a crystal body fabricated in accordance with the invention resting on a support and illustrating the cleavage along [110] planes of a polar crystal to form a rectangular parallelepiped type structure.

Referring next to FIG. 4 there is illustrated the use of the crystallographic geometry present in the crystal in accordance with the invention to provide a rectangular parallelepiped crystalline shape. The same reference numerals as used in FIG. 3 where applicable are employed. In FIG. 4 the surface 12 of the crystal 10 is positioned in contact with a support member 13. Through the cleaving operation as described with reference to FIG. 1 a crystalline body is provided having a perfectly rectangular shape in which the surfaces 11 and 12 each correspond to [100] crystallographic planes and each of the sides correspond to [110] crystallographic planes and are so labelled. As a result of the crystallographic geometry of the crystal each surface cleaved along a single crystallographic plane has optically flat sides and intersections with the other surface are at a precise 90° angle governed by the crystal geometry. Further, opposite cleaved surfaces are perfectly parallel.

The physical dimensions from one surface to another of the crystalline shape will be governed by the degree of accuracy of positioning the cleavage implement 4 illustrated in FIG. 1. It will be apparent that the edge of the implement must be of a straightness and sharpness of the order of the dimensions being sought. The cleavage implement 4 should be sufficiently sharp that the force is confined to a small area. As an order of magnitude figure, using approximately a 4 ounce pressure on a crystal approximately 0.250 inch long, crystals may be cleaved that are 0.0015×0.0015. It should be noted that bond strengths vary with different crystals and with environmental conditions. It will be apparent that with appropriate mechanical spacing equipment as is employed in diffraction grating manufacturing even smaller physical sizes may be achieved.

Another useful geometrical relationship within the crystal in accordance with the invention involves the use of the [111] crystallographic plane and the fact that [110] crystallographic planes intersect the [111] planes perpendicularly. This permits prisms to be fabricated wherein the intersecting sides form angles that are multiples of 60°. For examples, equilateral triangles, trapezoids, diamond shapes and hexagons.

Figure 5:
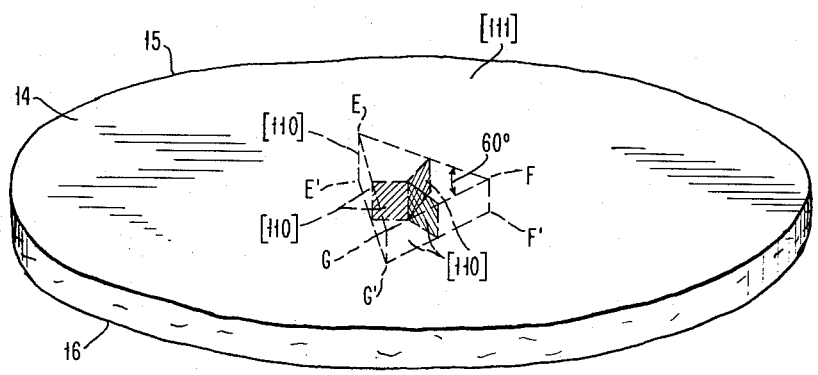
FIG. 5 illustrates a geometrical relationship between the [111] and the [110] crystallographic planes in a polar crystal.

Referring next to FIG. 5 a geometric figure is illustrated wherein a crystalline wafer 14 having two essentially parallel surfaces 15 and 16 is cut with each surface corresponding to a [111] crystallographic plane. There are three equivalent [110] crystallographic planes perpendicular to the z axis each bisecting the side of the triangle of the illustrated [111] plane. It will be then seen in FIG. 5 that the [111] crystallographic plane also intercepts [110] crystallographic planes perpendicular to the first three [110] planes and each joining each other at 60°. Considering the [111] triangle lying in the face 15 as defined by the letters EF and G and its counterpart lying in face 16 is defined by E'F' and G'. Then each of the planes EE'F'F, FGG'F', and EGG'E' define [110] crystallographic planes each intersecting another [110] plane at 60°.

Figure 6:
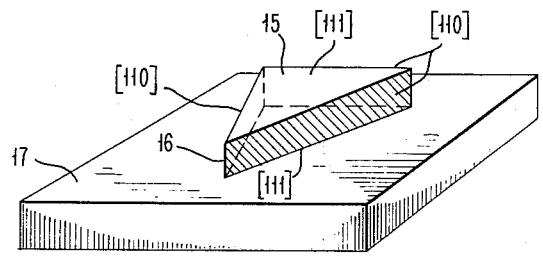
FIG. 6 is a view of a crystal body fabricated in accordance with the invention resting on a support and illustrating the cleavage along [110] planes in the crystal perpendicular to the [111] crystallographic plane of a polar crystal to form a triangular prism.

Transferring this relationship to FIG. 6 for cleavage purposes in accordance with the invention the [111] surfaces 15 and 16 are positioned parallel to the upper surface of block 17 provided as a support and for perspective. A configuration wherein the sides intersect at angles involving multiples of 60° such as the triangle illustrated may be now cleaved by an operation such as described in connection with FIG. 1. The resulting shape will have three [110] crystallographic planes meeting at 60° angles to each other and each plane will meet at a 90° angle with [111] crystallographic planes.

A point that has not been illustrated heretofore in the description of the invention is the fact that once the plane surface has been cleaved with the geometric knowledge as set forth in FIGS. 3 and 5, the exposed cleaved plane may then be positioned parallel to a support so that any orientation error in establishing the first reference face may be removed. The next direction of cleavage will in the case of FIG. 3, provide cleaved perpendicular ends.

Figure 7:
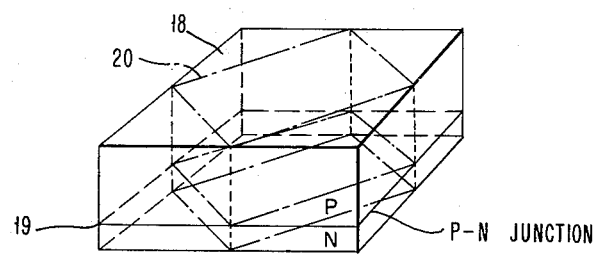
FIG. 7 is an illustration of a semiconductor laser illustrating internal light reflections.

Referring next to FIG. 7, there is illustrated a stimulated emission radiation device fabricated in accordance with the teachings of the invention. This device involves a block 18 of semiconductor material such as gallium arsenide having dimensions approximately 0.002 inch on a side and 0.001 inch high. Such a device when appropriate current is passed across a p-n junction 19 converts the current directly to light which when the particular optical mode of the light is selected for enhancement by the geometry of the shape becomes the favored optical mode. The light generated tends to self-stimulate in that particular mode by internal reflections in a light path shown by lines 20. Generally, light is directed out at a point not shown, preferably a corner. Such a device is a solid state laser and employs volumetric geometry of the surfaces. The physical requirements on the device are extremely rigid for example the light path 20 is shown within the device wherein the light is reflected off each wall of the shape and since the angle of incidence is equal to the angle of reflection to retain the light paths in a closed loop, precise 90° side intersections are essential. Since the wavelength of the light is on the order of angstrom units, very tight spacing sides is also required.

It will also be apparent that the mechanics of diffusion as practiced in semiconductors to position a p-n junction within a crystal is limited to an accuracy commensurate with the flatness of the surface through which the diffusion proceeded. Hence, to accurately position a p-n junction with respect to the surface of a crystal it will be essential that there be a perfect surface through which the diffusion can proceed and that such surface may be readily provided in accordance with the invention. A device of the type discussed in FIG. 7 is described in detail in copending patent application Serial No. 234,150, filed October 30, 1962 entitled "Lasers" by F. H. Dill, W. P. Dumke, G. J. Lasher and M. I. Nathan and assigned to the same assignee as this application and incorporated herein by reference.

What has been described is a method of achieving extremely small, but highly accurate, physical crystalline shapes by applying a localized stress to a crystal body effective to sever the crystal along the crystallographic plane of minimum bond strength whereby the crystallographic geometry of the crystal is employed to provide surface relationships.

While the invention has been particularly shown and described with reference to a preferred embodiment thereof, it will be understood by those skilled in the art that the foregoing and other changes in form and details may be made therein without departing from the spirit and scope of the invention.

What is claimed is:
1. The method of fabricating precisely shaped crystalline bodies comprising the steps of
   breaking a crystal body to determine a preferred plane of cleavage therein, forming a wafer of one of the crystalline parts from which a shaped body is to be formed the major surfaces of said wafer each being essentially parallel to a crystallographic plane that in turn is perpendicular to the crystallographic plane along which said crystal body severed, applying a support to said wafer on one of said major surfaces and severing the crystal wafer by applying a force concentrated on a line to said material, said force being applied in a direction perpendicular to said major faces of said wafer in a direction toward said support and said force being sufficient to at least partially fracture said crystal.

2. The method of forming an optical cavity comprising the steps of:

forming a wafer of crystalline material with a major surface of said wafer being essentially parallel to a crystallographic plane that in turn is perpendicular to a crystallographic plane of minimum bond strength of the particular crystalline material;

cleaving said wafer perpendicular to said major surface along at least two planes of minimum bond strength to expose at least two faces of said wafer each perpendicular to said major surface and each corresponding to a natural crystallographic plane of said wafer.

3. The method of claim 2 wherein said wafer is cleaved along parallel ones of said planes of minimum bond strength to expose two faces which are crystallographically parallel one to the other.

4. The method of claim 2 wherein said wafer is cleaved along intersecting ones of said planes of minimum bond strength to expose at least two faces of said crystal forming an angle with each other corresponding to the crystallographic angle between the natural crystallographic planes.

5. The method of claim 2 wherein said wafer is a semiconductor including a p-n junction extending parallel to said major surface and said cleaved faces are perpendicular to said p-n junction.

6. The invention of claim 2 wherein said crystalline material is gallium arsenide.

7. The method of claim 6 wherein said major surface of said gallium arsenide wafer is essentially parallel to the 100 plane of said crystal and said wafer is cleaved along 110 planes perpendicular to said 100 plane.

8. The invention of claim 2 wherein said wafer is formed with the shortest distance through said wafer being parallel to the crystallographic plane of minimum bond strength of said crystalline material.

9. The method of fabricating a semiconductor resonant cavity device comprising the steps of:

forming a wafer of crystalline semiconductor material with a major surface and a laser region each essentially parallel to a crystallographic plane which is perpendicular to a crystallographic plane of minimum bond strength of the particular crystalline material;

and cleaving said crystal perpendicular to said major surface along parallel planes of minimum bond strength to expose two faces of said crystal perpendicular to said major surface and corresponding to natural crystallographic planes of said material which are crystallographically parallel.

10. The method of fabricating a semiconductor resonant cavity device comprising the steps of forming a wafer of crystalline semiconductor material with a major surface essentially parallel to a crystallographic plane which is perpendicular to a crystallographic plane of minimum bond strength of the particular crystalline material;

forming a p-n junction in said semiconductor crystal parallel to said major surface and perpendicular to said crystallographic plane of minimum bond strength;

and cleaving said wafer perpendicular to said major surface to expose at least one face of said wafer perpendicular to said junction and corresponding to a natural crystallographic plane of said material.

References Cited by the Examiner

UNITED STATES PATENTS

| | | | |
|---|---|---|---|
| 2,151,736 | 3/1939 | Broughton. | |
| 2,355,877 | 8/1944 | Le Van | 125—30 |
| 2,392,271 | 1/1946 | Smith | 51—277 X |
| 2,392,528 | 1/1946 | Fankuchen. | |
| 2,858,730 | 11/1958 | Hanson | 125—30 X |
| 2,947,214 | 8/1960 | Schusuttke et al. | 51—277 X |
| 3,039,362 | 6/1962 | Dobrowolski | 88—106 |

OTHER REFERENCES

"Diamond and Gem Stone," Industrial Production, by Grodzinki, published 1942 by N.A.G. Press Ltd., London, pages 40–43 and 87–92.

HAROLD D. WHITEHEAD, *Primary Examiner.*

JOHN C. CHRISTIE, LESTER M. SWINGLE,
*Examiners.*

J. E. PEELE, *Assistant Examiner.*